United States Patent
Zeng et al.

(10) Patent No.: US 10,280,850 B1
(45) Date of Patent: May 7, 2019

(54) DOUBLE-ENDED ELECTRIC SUPERCHARGER

(71) Applicant: Ford Global Technologies, LLC, Dearborn, MI (US)

(72) Inventors: Tao Zeng, Bloomfield Hills, MI (US); Daniel William Kantrow, Ann Arbor, MI (US); Liangjun Hu, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/878,212

(22) Filed: Jan. 23, 2018

(51) Int. Cl.
| | | |
|---|---|---|
| *F02B 39/00* | (2006.01) | |
| *F02D 41/00* | (2006.01) | |
| *F02B 37/04* | (2006.01) | |
| *F02B 37/24* | (2006.01) | |
| *F02B 37/16* | (2006.01) | |
| *F04D 29/056* | (2006.01) | |
| *F02D 41/26* | (2006.01) | |
| *F02B 39/10* | (2006.01) | |

(52) U.S. Cl.
CPC .......... *F02D 41/0007* (2013.01); *F02B 37/04* (2013.01); *F02B 37/16* (2013.01); *F02B 37/24* (2013.01); *F02D 41/0052* (2013.01); *F02B 39/10* (2013.01); *F02D 41/26* (2013.01); *F04D 29/056* (2013.01)

(58) Field of Classification Search
CPC .......... F02B 39/10; F02B 37/04; F02B 37/16
See application file for complete search history.

(56) References Cited

U.S. PATENT DOCUMENTS

| | | | |
|---|---|---|---|
| 2,773,348 A | | 12/1956 | Grieshaber et al. |
| 3,105,632 A | | 10/1963 | Tanzberger |
| 4,125,345 A | * | 11/1978 | Yoshinaga .............. F04D 17/12 415/179 |
| 4,680,933 A | * | 7/1987 | Bozung ................. F02B 37/005 290/52 |
| 4,938,661 A | | 7/1990 | Kobayashi et al. |
| 4,955,199 A | * | 9/1990 | Kawamura ........... F02B 37/013 60/608 |
| 5,638,796 A | * | 6/1997 | Adams, III ............. F02B 33/40 123/565 |
| 5,794,445 A | | 8/1998 | Dungner |

(Continued)

FOREIGN PATENT DOCUMENTS

| | | |
|---|---|---|
| CN | 103758766 A | 4/2014 |
| EP | 1036275 B1 | 6/2005 |
| WO | 2016009186 A1 | 1/2016 |

OTHER PUBLICATIONS

Bauer, K. et al., "The Next Generation of Gasoline Turbo Technology," Proceedings of the 33rd International Vienna Motor Symposium, Apr. 26, 2012, Vienna, Austria, 14 pages.

*Primary Examiner* — Thomas Moulis
(74) *Attorney, Agent, or Firm* — Julia Voutyras; McCoy Russell LLP

(57) ABSTRACT

Methods and systems are provided for compound boosted engine comprising an electric supercharger. In one example, the electric supercharger may be double-ended with a compressor arranged on either side of an electric motor and rotationally coupled to the electric motor via shafts. The electric supercharger may be configured to provide boost assist to a twin turbocharger system via a bypass channel adapted with a bypass valve.

20 Claims, 5 Drawing Sheets

(56) References Cited

U.S. PATENT DOCUMENTS

| | | | | |
|---|---|---|---|---|
| 5,857,348 | A | * | 1/1999 | Conry ..................... F04D 25/06 |
| | | | | 417/423.12 |
| 6,079,211 | A | | 6/2000 | Woollenweber et al. |
| 6,129,524 | A | * | 10/2000 | Woollenweber ........ F04D 17/12 |
| | | | | 417/366 |
| 6,579,078 | B2 | | 6/2003 | Hill et al. |
| 8,181,462 | B2 | | 5/2012 | Arnold et al. |
| 2005/0155349 | A1 | * | 7/2005 | Sugiura ................... F02B 37/14 |
| | | | | 60/605.1 |
| 2005/0223737 | A1 | * | 10/2005 | Conry ..................... F04D 25/06 |
| | | | | 62/510 |
| 2007/0044776 | A1 | | 3/2007 | Gradu et al. |
| 2007/0151241 | A1 | * | 7/2007 | Arnold ..................... B60K 6/26 |
| | | | | 60/605.1 |
| 2007/0169747 | A1 | * | 7/2007 | Shimizu .................. F01D 25/12 |
| | | | | 123/434 |
| 2010/0263374 | A1 | * | 10/2010 | Tanaka .................... F02B 37/14 |
| | | | | 60/608 |
| 2010/0275890 | A1 | | 11/2010 | McDonald-Walker |
| 2010/0319343 | A1 | | 12/2010 | Arnold et al. |
| 2011/0265771 | A1 | | 11/2011 | Banker et al. |
| 2011/0276204 | A1 | | 11/2011 | Shutty et al. |
| 2012/0297767 | A1 | * | 11/2012 | Hofbauer ................ F02B 37/10 |
| | | | | 60/605.2 |
| 2015/0337850 | A1 | * | 11/2015 | An .......................... F02B 39/00 |
| | | | | 60/605.3 |
| 2016/0258348 | A1 | | 9/2016 | Rutschmann et al. |
| 2017/0037872 | A1 | * | 2/2017 | Back ....................... F04D 25/068 |
| 2018/0163617 | A1 | * | 6/2018 | Merritt ................... F01D 11/005 |

\* cited by examiner

DOUBLE-ENDED ELECTRIC SUPERCHARGER

FIELD

The present description relates generally to methods and systems for controlling a turbocharged vehicle engine to improve an engine transient response and reduce the likelihood of compressor surge and choke.

BACKGROUND/SUMMARY

Electric superchargers, also referred to as superchargers, boost assist devices, or E-boosters, may be adapted to turbocharged engine systems to reduce turbo lag and increase power output of the engine during certain engine or vehicle operating conditions. In particular, during low engine speeds when a turbocharger may experience difficulty in providing a desired compression, an electric supercharger may assist in boosting intake air. While the turbocharger includes a compressor mechanically driven by an exhaust turbine, the electric supercharger includes a compressor that is electrically driven by a motor. The electric supercharger may be staged in series or in parallel with the turbocharger in what may be referred to as a compound boosting configuration where the electric supercharger may be utilized to increase the transient performance of the turbocharger. By coupling the electric supercharger to turbocharged diesel or gasoline engines, an engine may be downsized without compromising peak power and torque performance.

In V6 or V8 engines where the engine may be configured with two banks of cylinders, twin turbochargers may be used. In such systems, each turbocharger may be coupled to an exhaust manifold of one of the cylinder banks, relying on exhaust gas generated during combustion to drive a rotation of the turbocharger turbines. An example of a dual turbocharged engine with two parallel turbochargers is shown by Banker et al. in U.S. 2011\0265771. Therein, an engine system is shown with twin parallel turbochargers for improving the boost supplied to an engine with dual cylinder banks. An air intake passage upstream of the twin turbochargers splits into two parallel intake passages that include the two turbocharger compressors. Thus the turbochargers provide boost to each bank of cylinders.

The engine system described in U.S. 2011\0265771 also includes low pressure exhaust gas recirculation (LP-EGR) loops coupling the exhaust manifolds of each cylinder bank to the intake passages upstream of the compressor as well as high pressure EGR (HP-EGR) pathways coupling the exhaust manifolds of each cylinder bank to the intake passages downstream of the turbocharger compressors. EGR allows a reduction in concentration of undesirable combustion byproducts such as $NO_x$ and particulates in the exhaust gas. Exhaust gas flowing from the cylinders through the exhaust manifold may be diverted from the exhaust turbine to the EGR loops or directed through a wastegate to the atmosphere after passing through an after treatment device, such as a catalyst. Gas flow may be selectively divided between a combination of the paths described above, depending on vehicle operating conditions.

The exhaust-driven turbochargers may be configured as variable geometry turbochargers (VGTs) where nozzles of the turbines may have vanes that vary the cross-sectional area of the turbine nozzle, thereby adjusting the rotational speed of the turbine wheel and the amount of boost delivered to the engine. VGTs may also be used to control EGR by increasing or decreasing the exhaust manifold pressure as a result of narrowing or widening the turbine nozzle flow area. The efficiency of the VGT may therefore affect EGR flow. For example, during engine transients, the turbine nozzles may be adjusted to decrease the flow area of the nozzles, increasing the EGR flow rate which may lead to a decrease in $NO_x$ in the exhaust emissions.

Electric superchargers, in addition to reducing turbo lag, may also assist during engine transients by supplementing the boost provided by the exhaust turbochargers when the exhaust turbochargers are unable to meet the boost demand. However, the typical positioning of the electrical superchargers upstream of the exhaust turbochargers may lead to additional complications. As an example, electrical superchargers often operate within a limited flow range of the turbocharger compressor, such as the surge and choke regions.

Compressor surge may occur, for example, when an operator tips-out of an accelerator pedal, resulting in decreased air flow and leading to reduced forward flow through the compressor at high pressure ratio (PR). In another example, surge may be caused in part by high levels of cooled EGR which increase compressor pressure while decreasing mass flow through the compressor. Compressor choke may be encountered at high flows, when an increase in compressor speed gives a diminishing increase in the rate of flow. When the flow at any point in the compressor reaches the choke condition, no further flow rate increase is possible. This condition represents the maximum compressor volumetric flow rate as a function of the pressure ratio. As one example, choke may occur when an operator tips-in from a part load or idle conditions to a high load condition, such as when going uphill with a load.

In order to widen the range of mass flow through which stable operation of the turbocharger compressors may occur, a diameter of the compressor wheels of the superchargers may be increased. However, increasing the compressor wheel diameters may result in higher pressure at the supercharger compressor outlet and thus higher pressure at the turbocharger compressor inlets, lowering efficiency of the turbocharger compressors.

Various approaches have been developed to address the turbocharger inefficiency resulting from coupling with a supercharger. One example approach to address this issue is shown by Rutschmann et al. in U.S. 2016\0258348. Therein, an internal combustion engine boosted by an exhaust turbocharger is disclosed with an electric supercharger arranged downstream of the turbocharger. The supercharger is positioned in a bypass to the main intake passage and air flow through the main intake passage may be diverted by closing a check valve in the main intake passage. Air that is not sufficiently boosted by the turbocharger compressor may then be additionally compressed by the supercharger when the check valve is closed. When boost pressure from the turbocharger compressor matches the requested amount of boost or torque, the check valve is opened, an electric motor of the supercharger is switched off, and air is delivered directly from the turbocharger compressor to a throttle valve. Thus, the supercharger assists the turbocharger in meeting boost demands while minimizing energy consumption. Furthermore, the boost assistance provided by the electrical supercharger may be adapted to systems with more than one turbocharger upstream of the supercharger.

However, the inventors herein have recognized potential issues with such systems. As one example, in engines with dual cylinder banks, it may be desirable to couple each of the twin turbochargers with an electrical supercharger directing boosted air to one of the cylinder banks to avoid cumbersome merging and splitting of intake passages. The incorporation of two superchargers in the vehicle front end, however, incurs higher costs as well as greater space requirements to accommodate the devices. Synchronization of the independently operated superchargers may impose complexity of control as well as undesirable air flow responses.

Further, the component life of the superchargers may be limited by frictional forces imposed on the supercharger arising from its configuration. Conventional electrical superchargers comprise an electric motor coupled to a compressor wheel via a shaft. The asymmetric arrangement of the supercharger may result in unbalanced frictional, or thrust, force in an axial direction, e.g. in a direction from the compressor wheel towards the electric motor. A thrust bearing is used to compensate for the thrust force and the effective lifetime of the supercharger may be based on degradation of the thrust bearing to a point where the thrust bearing may no longer mitigate the thrust force.

In one example, the issues described above may be addressed by a method for a supercharger, comprising an electric motor including a first output shaft and a second output shaft positioned on opposing sides of the electric motor and sharing a common rotational axis, a first compressor rotationally coupled to the first shaft, and a second compressor rotationally coupled to the second shaft. In this way, a single electric motor may simultaneously drive the rotation of the two compressor wheels of the double-ended electrical supercharger (or supercharger) to provide boost assistance to twin exhaust turbochargers.

As one example, an engine system includes a double-ended supercharger arranged downstream of twin exhaust turbochargers, at a location downstream of where air passages from the turbocharger compressor outlets merge into a single channel. The supercharger is configured as a doubled-ended supercharger wherein a first and a second output shaft extend from opposite sides of a single electric motor. A first compressor wheel is coupled to the first output shaft and a second compressor wheel is coupled to the second output shaft in a symmetric configuration to balance thrust forces along the axial direction. The supercharger may be positioned in a bypass passage coupled to the main intake passage downstream of the twin turbochargers. A bypass valve may be disposed in the intake passage that diverts air flow to the bypass passage when commanded to close based on engine operating conditions. For example, a controller may command the bypass valve to close responsive to low engine loads where boost provided by the turbocharger compressors is sufficient to meet the boost demand. By closing the bypass valve, intake air is flowed directly from the turbocharger compressor to the engine cylinders via a main intake air passage.

In this way, by configuring a supercharger with two compressors driven by a single electric motor, the two compressors of the double-ended supercharger are automatically synchronized, reducing the complexity of control in comparison to configurations with two distinct electric superchargers coupled to distinct turbochargers of a twin-turbo system. By incorporating of the two compressors onto a single supercharger, costs are reduced and packaging constraints of a boosted engine system may be better met. By relying on a single set of electronics and a common bypass valve to control air flow through the supercharger, control complexity of the boosted engine system is reduced without compromising boost control. By relying on a double-ended configuration, the supercharger may operate in a high efficiency zone with a wider flow range and improved vehicle transient response without degrading exhaust emissions. Furthermore, the component life of the supercharger may be increased by balancing axial thrust forces with the symmetric configuration. Overall, the boost assistance provided by the double-ended supercharger as well as its mechanical efficiency may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3 is shown approximately to scale.

DETAILED DESCRIPTION

Figure 1:
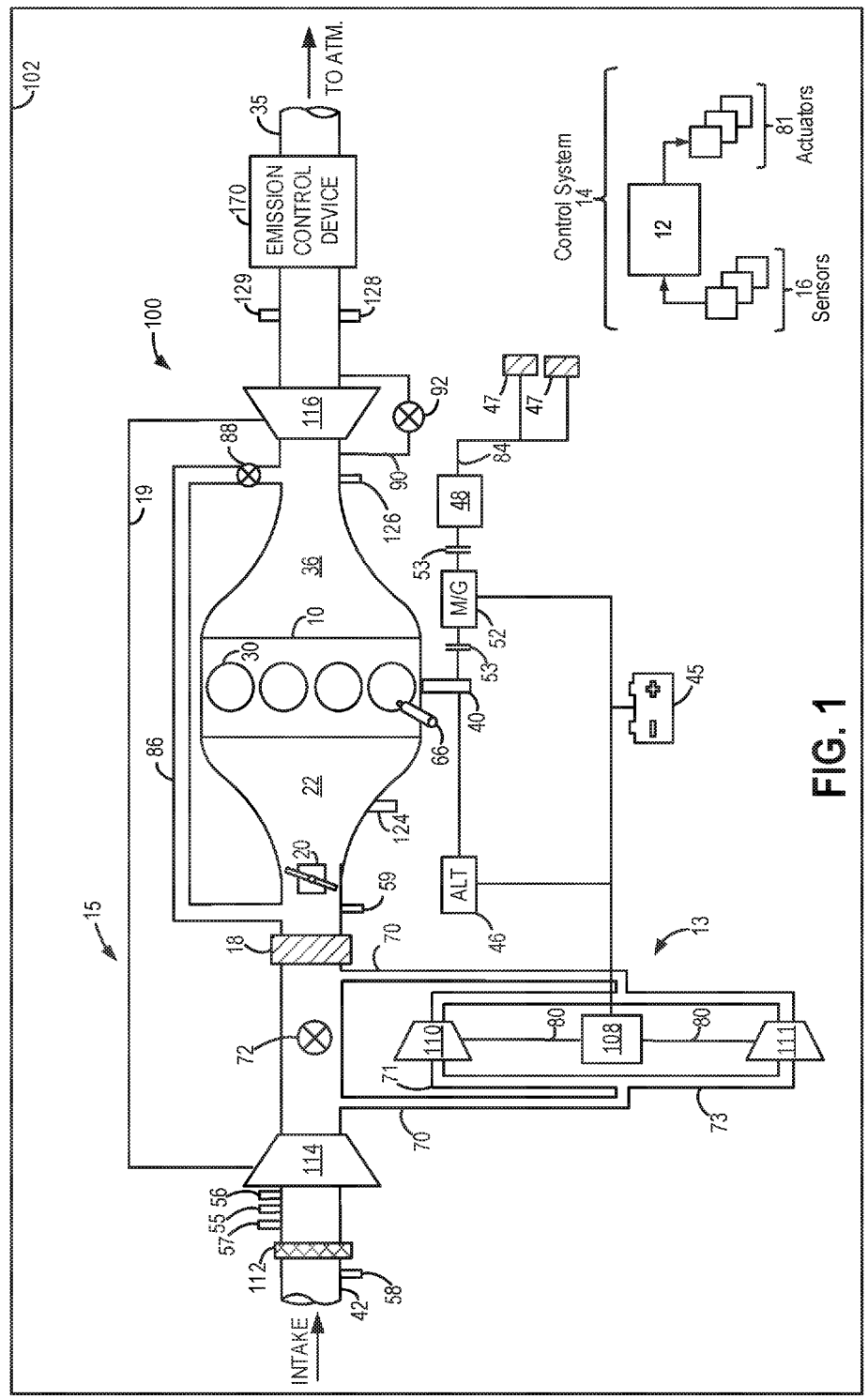
FIG. 1 shows a schematic diagram of a compound boosted engine having multiple staged intake compression devices and a bypass valve.
Figure 2:
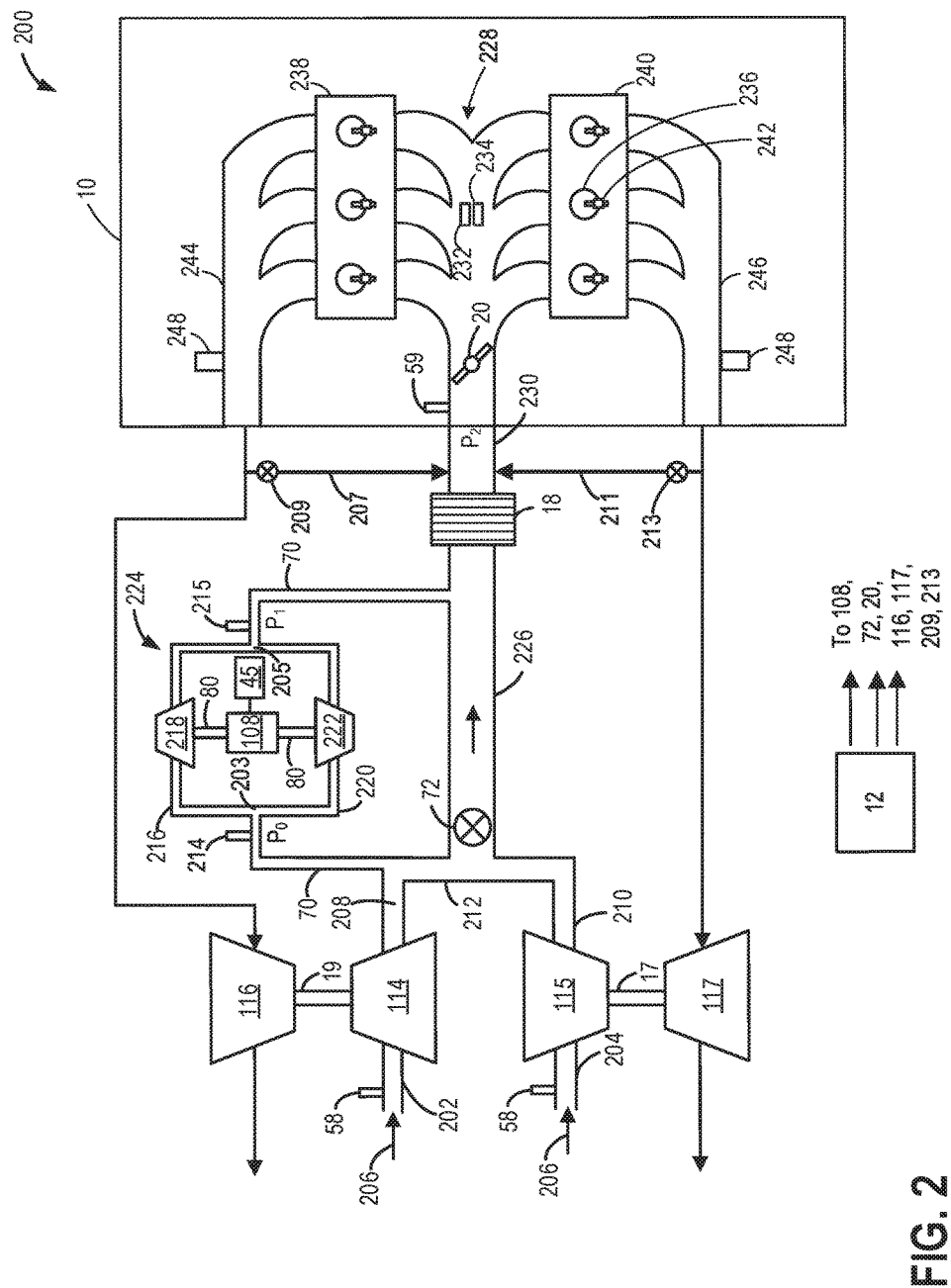
FIG. 2 shows another embodiment of a compound boosted engine system configured with a double-ended electrical boost assist device and a bypass valve.
Figure 3:
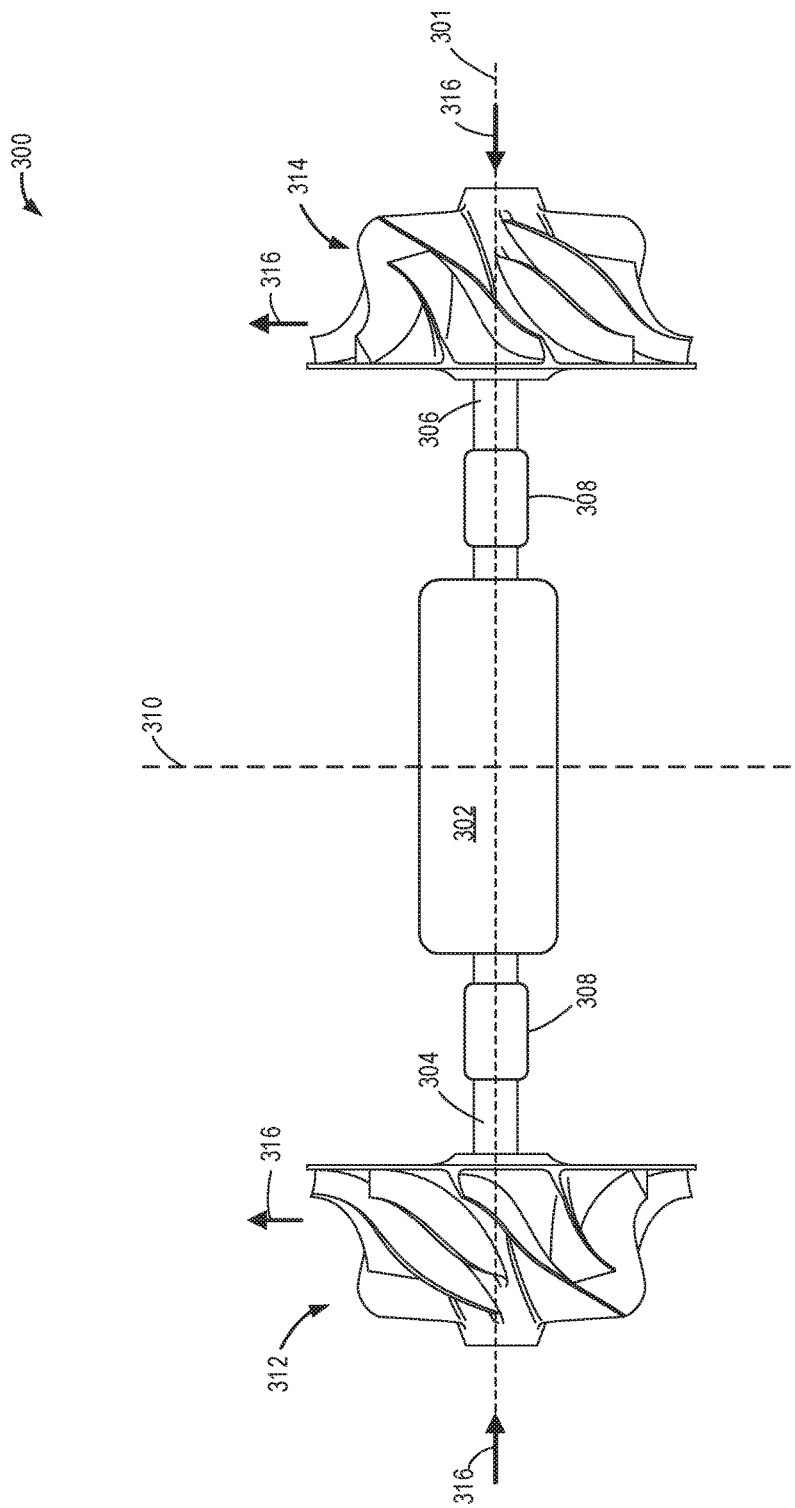
FIG. 3 shows a double-ended electrical boost assist device.

The following description relates to systems and methods for boost control in an engine system having staged boosting devices, wherein at least one of the boosting devices is configured with electric assist. A non-limiting example of a boosted engine system is shown in FIG. 1 with one end of a double-ended electrical supercharger (DES) included in a boosted air path of the engine. Another embodiment of the boosted engine system is depicted in FIG. 2 with dual cylinder banks, each adapted to air passages coupled to one end of the DES. Air compressed by main turbochargers of the engine system may be diverted to the DES or channeled directly to the intake via adjustments to a position of a bypass valve. An example embodiment of the DES is shown in FIG. 3. An engine controller may be configured to perform a control routine, such as the example routine of FIG. 4, to operate the DES in coordination with turbocharger operation to improve boost control via adjustments to a bypass valve. An example operational timeline of an engine configured with the DES in a bypass passage where air flow through the bypass passage is controlled by the bypass valve is shown in FIG. 5.

An example boosted engine system 100 is illustrated in FIG. 1, comprising an engine 10 of a vehicle 102. In some examples, vehicle 102 may be a hybrid vehicle with multiple sources of torque available to one or more vehicle wheels 47. In other examples, vehicle 102 is a conventional vehicle with only an engine. In the example shown, a powertrain of vehicle 102 includes engine 10 and an electric machine 52 which may be a motor or a motor/generator. Engine 10 and electric machine 52 are connected to vehicle wheels 47 via a transmission 48 when one or more clutches 53 are engaged. In the example of FIG. 1, a first clutch 53 is shown between engine 10 and electric machine 52 and a second clutch 53 is arranged between electric machine 52 and transmission 48. A controller 12 may instruct an actuator of each clutch 53 to engage or disengage the clutch, thereby connecting or disconnecting engine 10 from electric machine 52 and the components connected thereto and/or connecting or disconnecting electric machine 52 from transmission 48 and the components connected thereto. For example, torque from engine 10 may be transferred to vehicle wheels 47 via a crankshaft 40, transmission 48, and a powertrain shaft 84 when clutches 53 are engaged. Transmission 48 may be a gearbox, a planetary gear system, or another type of transmission. Transmission 48 may be a fixed ratio transmission that includes a plurality of gear ratios to allow engine 10 to rotate at a different speed than wheels 47. By changing a torque transfer capacity of first clutch 53 (e.g., an amount of clutch slippage), an amount of engine torque relayed to the wheels via powertrain shaft 84 may be modulated.

The powertrain may be configured in various manners, including as a parallel, a series, or a series-parallel hybrid vehicle. In electric vehicle embodiments, a system battery 45 may be a traction battery that delivers electrical power to electric machine 52 to provide torque to vehicle wheels 47. In some embodiments, electric machine 52 may also be operated as a generator to provide electrical power to charge system battery 45, for example, during a braking operation. It will be appreciated that in other embodiments, including non-electric vehicle embodiments, system battery 45 may be a typical starting, lighting, ignition (SLI) battery coupled to an alternator 46.

Alternator 46 may be configured to charge system battery 45 using engine torque drawn from the crankshaft during engine running. In addition, alternator 46 may power one or more electrical systems of the engine, such as one or more auxiliary systems including a heating, ventilation, and air conditioning (HVAC) system, vehicle lights, an on-board entertainment system, and other auxiliary systems based on their corresponding electrical demands. A voltage regulator may be coupled to alternator 46 in order to regulate the power output of the alternator based upon system usage requirements, including auxiliary system demands.

In the depicted embodiment, engine 10 is a compound boosted engine configured with multiple, staged boosting devices. Specifically, engine 10 includes a first boosting device staged upstream of a second boosting device. Herein, the first boosting device is a primary boosting device and the second boosting device is an auxiliary boosting device, although other configurations may be possible. The primary boosting device is configured as a turbocharger 15 while the auxiliary boosting device is configured as a double-ended supercharger (DES) 13. The depicted configuration results in a first compressor 114 (of the turbocharger 15) being positioned in an engine intake passage 42 upstream of a second compressor 110 and a third compressor 111. The second and third compressors 110, 111 are compressors of the DES 13, arranged on opposite sides of an electric motor 108 and configured to operate with electric assistance from the electric motor. However, other combinations and configurations of boosting devices may be possible without departing from the scope of this disclosure. For example, in alternate embodiments, turbocharger 15 may be an electric turbocharger having an electric motor coupled to the compressor, turbine, or turbocharger shaft while the supercharger is configured with one or two compressors. As well, the supercharger may be an electrical or mechanical supercharger. In still other examples, both the first and second boosting device may be electric superchargers or electric turbochargers.

Turbocharger 15 includes first compressor 114, which is driven by a turbine 116. First compressor 114 is shown as a turbocharger compressor mechanically coupled to turbine 116 via a shaft 19, the turbine 116 driven by expanding engine exhaust. In one embodiment, the turbocharger may be a twin scroll device. In another embodiment, the turbocharger may be a variable geometry turbocharger (VGT), wherein turbine geometry is actively varied as a function of engine operating conditions.

Fresh air is introduced along intake passage 42 into engine 10 via air box 112 and flows to first compressor 114. Operation of first compressor 114 increases a boost pressure downstream of first compressor 114 in intake passage 42. A junction is positioned downstream of first compressor 114 and upstream of a bypass valve 72 that determined the flow direction of air depending on a position of the bypass valve 72. The junction includes a pathway for air flow to DES 13 via a bypass 70.

DES 13 includes second compressor 110 and third compressor 111, both of which are driven by the common electric motor 108. Specifically, a wheel of second compressor 110 and a wheel of third compressor 111 may be driven by power received from electric motor 108 along supercharger compressor shafts 80. In some examples, second compressor and third compressor 110, 111 of DES 13 may additionally be driven by the engine crankshaft via a clutch and gear mechanism. Electric motor 108 may be powered by an on-board energy storage device, such as system battery 45. Electric motor 108 may be additionally or alternatively powered by alternator 46. An amount of electrical power delivered to electric motor 108 may be varied in order to adjust a duty cycle of the E-booster. In one example, the amount of electric power delivered to electric motor 108 may be increased to increase the speeds of second and third compressors 110, 111. As a result of the electrical assistance, DES 13 may be rapidly spun up, providing for a fast-acting or high frequency boost actuation.

Second and third compressors 110, 111 are positioned in bypass 70, parallel to and offset from intake passage 42. Air received along intake passage 42 enters first compressor 114 and then flows towards intake manifold 22. Air may be directed from intake passage 42, downstream of the first compressor 114, into bypass 70 and through second compressor 110 via adjustments to the position of an electric supercharger bypass valve (ESBV) 72. ESBV 72 is positioned along intake passage 42, downstream of an inlet of bypass 70. When ESBV 72 is commanded open, air may flow from first compressor 114 to intake manifold 22 without passing through bypass 70 and second compressor 110. In one example, ESBV 72 may be commanded open when the second compressor is not actuated, such as when the turbocharger 15 has spooled up, so that intake air compressed by the turbocharger compressor 114 can be delivered to engine cylinders without flowing through the DES 13. When ESBV 72 is commanded closed, air may flow from first compressor 114 to the intake manifold 22 upon flowing through bypass 70 and second and third compressors 110, 111 via a first bypass branch 71, directing air to second compressor 110, and a second bypass branch 73, directing air to third compressor 111. The first bypass branch 71 and second bypass branch 73 merge downstream of the second and third compressors 110, 111 into a single channel that is a continuation of bypass 70.

In one example, ESBV 72 may be commanded closed when second and third compressors 110, 111 are actuated, such as when turbocharger 15 has not spooled up, and there is a transient increase in torque or boost demand. Consequently, intake air is compressed by second and third compressors 110, 111 of DES 13 and then delivered to engine cylinders while flowing through bypass 70. By spinning up the DES 13 via electric motor 108, a burst of boost pressure may be rapidly provided to the engine, improving transient boost response while turbocharger 15 spools up.

Electric motor 108 may be configured as a motor-generator. Thus, during conditions when electric assistance is required for boost build-up, electric motor 108 may provide positive torque to drive either the centrifugal compressors of the DES 13 (or the turbocharger shaft) to improve the transient boost pressure delivery. However, electric motor 108 is also capable of energy recuperation by "braking" the motor shaft. Therein, negative torque may be applied to the compressor (or shaft), reducing the compressor speed and concurrently charging the system battery (such as battery 45) coupled to the motor.

ESBV 72 may be a continuously variable valve wherein a position of the valve is continuously variable from a fully closed position to a fully open position. Alternatively, ESBV 72 may be an on-off valve. Herein, an open or partially open position may be a default valve position. In response to an indication of low boost pressure relative to boost demand or compressor operation approaching a surge or choke limit, the opening of ESBV 72 may be decreased or ESBV 72 may be closed. For example, ESBV 72 may be adjusted from the default, partially open position or fully open position toward a less open position or the closed position, with a degree of opening based on the magnitude of the difference between boost supply and demand, indication of surge, or indication of choke (e.g., the compressor ratio, the compressor flow rate, a pressure differential across the compressor, etc.). In alternate examples, ESBV 72 may be held closed during boosted engine operation (e.g., peak performance conditions) to decrease boost response time and increase peak performance.

Air compressed by the first or the second compressor is then directed to the intake manifold 22 via passage through each of a charge-air cooler (CAC) 18 (also referred to as an intercooler herein), and a throttle valve 20, in that order. CAC 18 may be an air-to-air or water-to-air heat exchanger, for example. Intake manifold pressure (e.g., a pressure of the air charge within the intake manifold) may be determined using a manifold absolute pressure (MAP) sensor 124.

Intake manifold 22 is coupled to a series of combustion chambers 30 through a series of intake valves (not shown). The combustion chambers are further coupled to an exhaust manifold 36 via a series of exhaust valves (not shown). In the depicted embodiment, a single exhaust manifold 36 is shown. However, in other embodiments, the exhaust manifold may include a plurality of exhaust manifold sections or banks. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted for the desired combustion and emissions-control performance. For example, the cam timing may be adjusted via a variable cam timing system to move the intake and exhaust cams to a position that provides the optimal volumetric efficiency for the given operating conditions.

Combustion chambers 30 may be supplied one or more fuels, such as gasoline, alcohol fuel blends, diesel, biodiesel, compressed natural gas, etc. Fuel may be supplied to the combustion chambers via direct injection, port injection, throttle valve-body injection, or any combination thereof. In the depicted example, fuel is provided to each combustion chamber 30 via direct injection by a fuel injector 66 (while only one fuel injector is shown in FIG. 1, each combustion chamber includes a fuel injector coupled thereto). Fuel may be delivered to fuel injector 66 by a fuel system (not shown) including a fuel tank, a fuel pump, and a fuel rail. In the combustion chambers, combustion may be initiated via spark ignition and/or compression ignition.

As shown in FIG. 1, exhaust from exhaust manifold 36 is directed to turbine 116 to drive the turbine. When reduced turbine torque is desired, a portion of exhaust may be directed instead through a wastegate 90, bypassing the turbine. A wastegate actuator 92 (e.g., wastegate valve) may be actuated open to relieve at least some exhaust pressure from upstream of turbine 116 to a location downstream of turbine 116 via wastegate 90. By reducing exhaust pressure upstream of turbine 116, turbine speed may be reduced. When increased boost pressure is demanded, first compressor 114 may be spooled up by spooling up turbine 116. Therein, more turbine torque is provided by directing a larger portion of exhaust to be directed through the turbine, and not through wastegate 90. Wastegate actuator 92 (e.g., wastegate valve) may be actuated closed to increase the exhaust pressure upstream of turbine 116. By increasing the exhaust pressure upstream of turbine 116, turbine speed may be increased.

The combined flow from turbine 116 and wastegate 90 flows through an emission control device 170. In general, emission control device 170 may include one or more exhaust after-treatment components configured to reduce an amount of one or more substances in the exhaust flow. For example, one exhaust after-treatment component may be configured to trap $NO_x$ from the exhaust flow when the exhaust flow is lean and to reduce the trapped $NO_x$ when the exhaust flow is rich. In other examples, an exhaust after-treatment component may be configured to disproportionate $NO_x$ or to selectively reduce $NO_x$ with the aid of a reducing agent. In still other examples, emission control device 170 includes a three-way catalyst configured to oxidize residual hydrocarbons and carbon monoxide while reducing $NO_x$ in the exhaust flow. Different exhaust after-treatment catalysts having any such functionality may be arranged in wash coats or elsewhere in emission control device 170, either separately or together. In some embodiments, the emission control device 170 may further include a regeneratable soot filter configured to trap and oxidize soot particles in the exhaust flow.

All or part of the treated exhaust from emission control device 170 may be released into the atmosphere via an exhaust conduit 35.

Depending on operating conditions, however, some exhaust may be diverted instead to intake passage 42 via an exhaust gas recirculation (EGR) passage 86, including an EGR cooler (not shown) and EGR valve 88. Exhaust passage 86 is shown in FIG. 1 as a high pressure EGR (HP-EGR) loop, providing a passage coupling exhaust manifold 36 at a high pressure region upstream of turbine 116 to intake passage 42 at another high pressure region between CAC 18 and throttle valve 20. In other embodiments of engine system 100, a low pressure EGR loop (LP-EGR) may also be included providing a low pressure exhaust path between a point downstream of turbine 116 and upstream of emission control device 170 to intake passage 42 upstream of first compressor 114. Recirculation of exhaust gas and accompanying engine dilution reduces nitrogen oxide ($NO_x$) emissions, and thus increasing EGR flow may decrease release of $NO_x$ to the environment.

One or more sensors may also be coupled to intake passage 42 upstream of first compressor 114 for determining a composition and condition of aircharge entering the compressor. These sensors may include, for example, a pressure sensor 58 for estimating a barometric pressure of air upstream of air box 112. Other sensors include a temperature sensor 55 for estimating a compressor inlet temperature, and a pressure sensor 56 for estimating a compressor inlet pressure. Still other sensors may include, for example, air-fuel ratio sensors, humidity sensors, etc. Likewise, one or more sensors may also be coupled to intake passage 42 downstream of the first compressor 114 and upstream of the second compressor 110 for determining a composition and condition of air charge entering the second compressor. In other examples, one or more of the first or second compressor inlet conditions (such as humidity, temperature, etc.) may be inferred based on engine operating conditions. The sensors may estimate a condition of the intake air received at the second compressor inlet from the intake passage. In addition, a throttle inlet pressure (TIP) sensor 59 may be coupled downstream of CAC 18 and upstream of throttle valve 20 for estimating a boost pressure delivered to the engine.

During an operator tip-in event, when going from engine operation without boost to engine operation with boost responsive to an increase in operator torque demand, turbo lag can occur. This is due to delays in turbine 116 spin-up resulting from the turbocharger being a slower-acting compression device, and momentary reduction in flow through first compressor 114 when throttle valve 20 opens at the tip-in. The same may also occur when the engine is operating boosted and there is a transient increase in boost demand due to an increase in accelerator pedal application by the vehicle operator. To reduce this turbo lag, during those selected conditions, both the double-ended E-booster 13 and turbocharger 15 may be enabled. In particular, the faster-acting, electrically actuated compression device, the double-ended E-booster 13, may be used to improve the transient boost response. Specifically, responsive to the tip-in, wastegate actuator 92 may be closed (e.g., fully closed) to increase exhaust flow through turbine 116. While turbine 116 spins-up, boost pressure can be transiently provided by second compressor 110. Enabling DES 13 may include drawing energy from system battery 45 to spin electric motor 108 and thereby accelerate second compressor 110 (as well as third compressor 111). In addition, ESBV 72 may be closed (e.g., fully closed) so as to enable a larger portion of intake air to flow through bypass 70 and be compressed by second and third compressors 110, 111. When turbine 116 has sufficiently spun up and turbocharger 15 is capable of providing the requested amount of boost, second and third compressors 110, 111 may be decelerated by disabling electric motor 108 (e.g., by discontinuing the supply of power to electric motor 108 from battery 45). In addition, ESBV 72 may be opened so as to enable a larger portion of air to bypass second compressor 110.

During an operator tip-out event, when going from engine operation with boost to engine operation without boost (or reduced boost), compressor surge may occur. This is due to a decreased flow through first compressor 114 when throttle valve 20 closes at the tip-out. The reduced forward flow through first compressor 114 can cause surge and degrade turbocharger performance. In addition, surge can lead to noise, vibration, and harshness (NVH) issues such as undesirable noise from the engine intake system. To enable the torque demand to be rapidly reduced responsive to the tip-out without incurring compressor surge during a default mode of vehicle operation, where the default mode may comprise engine operation at low speeds and low loads, ESBV 72 may be closed and electric motor 108 actuated to spin. Compression of air at second and third compressors 110, 111 results in an increase in boost pressure downstream of DES 13 compressors as well as a decrease in pressure in intake passage 42 between first compressor 114 and the DES 13. Pressure accumulation at an outlet of first compressor 114 is alleviated, shifting compressor operation away from surge conditions. In addition, wastegate actuator 92 may be moved to a more open (e.g., fully open) position so that more of the exhaust flow travels to the tailpipe while bypassing the turbine, thereby expediting turbine spin-down.

When turbocharger 15 is configured as a VGT with EGR but without electrical boost assist, compressor surge may induce opening of turbine nozzle vanes, e.g. widening gaps between each of the vanes, to decrease the air stream velocity to the turbine wheel, thus decreasing the rotational speed of turbine 116. As a result of opening the vanes, EGR flow and a fuel economy of vehicle 102 may be diminished while $NO_x$ emissions increase. In the example engine system 100 of FIG. 1, however, the engagement of the double-ended E-booster when operation of first compressor 114 approaches a surge limit may prevent the opening of turbine nozzle vanes and assist in maintaining EGR flow.

During a rapid operator tip-in event, such as going from default vehicle operation to elevated engine loads, speed, and boost demand compressor choke may occur. Throttle valve 20 is fully opened at the tip-in, and mass flow into first compressor 114 may increase the spinning of the compressor wheel above a tolerance of turbocharger 15. In the event of first compressor 110 approaching choke conditions, ESBV 72 may partially opened so that a portion of the air flow is, diverted to bypass 70 with electric motor 108 deactivated. Flow is blocked through bypass 70, creating resistance to the increased flow in first compressor 114. Furthermore, wastegate actuator 92 may be moved to a less open position so that more of the exhaust flow is delivered to turbine 116, thereby regulating the spinning speed of turbine 116 so that first compressor 114 is able to provide boost to meet the boost demand once the pressure ratio across first compressor 114 increases.

Controller 12 may be included in a control system 14. Controller 12 is shown receiving information from a plurality of sensors 16 (various examples of which are described herein) and sending control signals to a plurality of actuators 81 (various examples of which are described herein). As one example, sensors 16 may include an exhaust gas sensor 126 located upstream of turbine 116, MAP sensor 124, an exhaust temperature sensor 128, an exhaust pressure sensor 129, compressor inlet temperature sensor 55, compressor inlet pressure sensor 56, a mass air flow (MAF) sensor 57, pressure sensor 58, and TIP sensor 59. Other sensors, such as additional pressure, temperature, air/fuel ratio, and composition sensors, may be coupled to various locations in engine system 100. The actuators 81 may include, for example, throttle valve 20, ESBV 72, electric motor 108, wastegate actuator 92, and fuel injector 66. Controller 12 may receive input data from the various sensors, process the input data, and employ the various actuators to adjust engine operation based on the received signals and instructions stored on a memory of the controller. The controller may employ the actuators in response to the processed input data based on instruction or code programmed therein corresponding to one or more routines, such as example control routine described herein with regard to FIG. 4. As an example, responsive to measured pressures indicating a boost pressure deficiency when operating the turbocharger, the controller may actuate the electric motor driving the supercharger compressors and actuate the ESBV closed in order to provide additional boost via the supercharger compressors.

Another example embodiment of a compound boosted engine system is shown at FIG. 2. Components previously introduced may be similarly numbered. FIG. 2 depicts an example boosted engine system 200 having a twin turbocharged configuration with a double-ended supercharger (E-booster) providing electrical boost assist and high pressure EGR (HP-EGR loops).

Engine system 200 may receive intake air at intake passages 202 and 204. Intake passage 202 and 204 are shown as individual passages in FIG. 2 and may include an air box, pressure sensor, temperature sensor, such as air box 112 and sensors 55, 56, 57 of FIG. 1, in each passage. In some examples, intake passages 202 and 204 may merge at a point upstream of the sections of each passage shown in FIG. 2 so that engine system 200 has a branched air intake system comprising one air box and one set of sensors.

Air flowing into parallel intake passages 202 and 204, indicated by arrows 206, is boosted by first turbocharger compressor 114 and second turbocharger compressor 115, respectively. The portions of boosted air exiting the first and second turbocharger compressors 114, 115 pass through passages 208 and 210, respectively and connect to a common passage 212. Common passage 212 is coupled to main intake passage 226. A first section of bypass 70, branches from a region where passage 208 merges with common passage 212. A double-ended supercharger (DES) 224 is arranged in bypass 70 so that the flow of air into bypass 70 is split equally between two compressors of the DES 224, positioned on opposite sides of an electric motor 108. The two compressors of the DES 224 are downstream of the first and second turbocharger compressors 114, 115.

Air may flow into the first section of bypass 70 when ESBV 72 is closed. ESBV 72 may be closed during conditions when DES 224 is actuated and the turbocharger compressors are not able to meet the transient increase in boost pressure demand. In particular, as the turbocharger compressors spool up, DES 224 is powered via electric motor 108 to provide compressed air to the engine intake manifold. The first section of bypass 70 may include a pressure sensor 214 and may split at a first fork 203 into a first bypass channel 216 that leads to a first supercharger compressor 218 and a second bypass channel 220 that leads to a second supercharger compressor 222 of the DES 224. Intake air flows into the first section of bypass 70 and is divided between first bypass channel 216 and second bypass channel 220. Specifically, at least a portion of intake air is directed to first supercharger compressor 218 via first bypass channel 216 and at least another portion of the intake air is directed to second supercharger compressor 222 via second bypass channel 220. The first and second supercharger compressors 218 and 222 are both connected to electric motor 108 by shafts 80. Electric motor 108 may be powered by an energy storage device as described above, such as system battery 45 of FIG. 1.

The first and second compressors 218, 222 of the DES 224 are coupled to electric motor 108 so that activation of electric motor 108 drives a simultaneous rotation of the first and second compressor 218, 222. By spinning the first and second compressors 218, 222 at a same acceleration, speed, and deceleration, as actuated by electric motor 108, axial thrust forces, e.g., along shafts 80, may be balanced. Deactivation of electric motor 108 results in concurrent halting of first and second compressors 218, 222 of the DES 224.

The air compressed by first supercharger compressor 218 and the air compressed by second supercharger compressor 218 may combine at a second fork 205 downstream of both compressors into a second section of bypass 70 which merges at an outlet end of bypass 70 with main intake passage 226. A pressure sensor 215 may be positioned in the second section of bypass 70. Main intake passage 226 extends from common passage 212 to a charge air cooler (CAC) 18 and includes ESBV 72. ESBV 72 may be open during conditions when boosted air is not required or when the turbocharger compressors are able to meet the boost pressure demand, directing flow of boosted air from the turbocharger compressor to engine 10. A proportioning of flow through main intake passage 226 and bypass 70 may be controlled by positioning of the ESBV 72 as described above. Air that has been boosted by the first and second turbocharger compressors 114, 115 and/or air that has been boosted by the DES 224 in addition to compression by first and second turbocharger compressors 114, 115, may be cooled by CAC 18 before flowing to an engine intake manifold 228 via intake passage 230.

Throttle valve 20 and TIP sensor 59 may be disposed in intake passage 230 downstream of CAC 18. Intake passage 230 provides intake air to intake manifold 228 of engine 10. Intake manifold 228 may include an intake manifold pressure sensor 232 for estimating a manifold pressure (MAP) and/or an intake manifold temperature sensor 234 for estimating a manifold air temperature (MCT), each communicating with controller 12.

Engine 10 may include a plurality of cylinders 236 arranged in a first bank (or group of cylinders) 238 and a second bank 240. In the depicted non-limiting example, engine 10 is shown with six cylinders arranged in a V-configuration, e.g., engine 10 is a V6 engine. Specifically, the plurality of cylinders 236 are arranged in the first and second bank 238, 240 with each bank including three cylinders. Each cylinder of the plurality of cylinders 236 may be configured with a fuel injector 242. In the depicted example, fuel injector 242 is a direct in-cylinder injector. However, in other examples, fuel injector 242 can be configured as a port fuel injector.

Intake air supplied to the plurality of cylinders 236 via intake passage 230 and controlled by a position of throttle valve 20 may be used for fuel combustion. Combustion products may be exhausted through a first exhaust passage 244 coupled to a first group of cylinders in the first bank 238 and a second exhaust passage 246 coupled to a second group of cylinders in the second bank 240. The first and second exhaust passages 244, 246 are parallel and direct exhaust gas to first exhaust turbine 116 and second exhaust turbine 117, respectively. In turn, first and second exhaust turbines 116, 117, provide mechanical work to corresponding first and second turbocharger compressors 114, 115 through first shaft 19 and second shaft 21 to boost intake air. Alternatively, some or all of the exhaust gas in parallel first and second exhaust passages 244, 246 can bypass the turbines via corresponding wastegates (not shown here but described earlier with reference to FIG. 1).

One or more additional valves and sensors described earlier with reference to the engine system of FIG. 1 may be similarly included in the engine system of FIG. 2, such wastegate valves and various pressure and temperature sensors.

In some examples, first and second exhaust turbines 116 and 117 may be configured as variable geometry turbines, wherein controller 12 may adjust the position of the turbine impeller blades (or vanes) to vary the level of energy that is obtained from the exhaust gas flow and imparted to their respective compressor. Alternatively, first and second exhaust turbines 116 and 117 may be configured as variable nozzle turbines, wherein controller 12 may adjust the position of the turbine nozzle to vary the level of energy that is obtained from the exhaust gas flow, and imparted to their respective compressors. For example, the control system can be configured to independently vary the vane or nozzle position of the first and second exhaust gas turbines 116 and 117 via respective actuators. In addition, each of the parallel exhaust passages may include an exhaust gas sensor 248 and an emission control device, as elaborated with reference to FIG. 1.

A first high pressure exhaust gas recirculation (HP-EGR) loop 207 couples exhaust passage 244 to intake passage 230 and a second HP-EGR loop 211 couples exhaust passage 246 to intake passage 230. First HP-EGR loop 207 may recirculate exhaust gas produced by combustion at the first bank 238 from exhaust passage 244, at a region downstream of the first bank 238 and upstream of first turbine 116, to a point along intake passage 230 downstream of CAC 18 and upstream of throttle valve 20. Similarly, second HP-EGR loop 211 may recirculate exhaust gas produced by combustion at the second bank 240 from exhaust passage 246, at a region downstream of the second bank 240 and upstream of second turbine 117, to a point along intake passage 230 downstream of CAC 18 and upstream of throttle valve 20. The flow of EGR to the engine intake may result in engine dilution at combustion. The channeling of exhaust gas through the HP-EGR loops 207, 211 may be controlled by respective EGR valves 209 and 213, arranged within the HP-EGR loops 207, 211. HP-EGR flow may be driven by a negative pressure differential between the intake manifold and the exhaust manifold. Thus, HP-EGR may be affected by accumulation of pressure upstream of the turbocharger turbines 116, 117. The flow of exhaust gas through HP-EGR loops 207, 211 may be adjusted by positioning of the turbine vanes. For example, vehicle operation at light engine loads and speeds where boost demand is low, the vanes may be adjusted to narrow the flow area of the turbine nozzle thereby increasing turbine speed. Pressure in the exhaust passage upstream of the turbine may rise, inducing HP-EGR flow. Conversely, during high engine loads and increased boost demand, the vanes may be adjusted to widen the flow area of the turbine nozzle to increase boost pressure and reducing HP-EGR flow. As described with reference to FIG. 4, controller 12 may control the opening and closing of ESBV 72 based on torque or boost pressure shortfall, and further based on a change in engine fuel efficiency upon closing the valve. The boost pressure shortfall may be determined by comparing pressure ratios across different parts of the engine system. For example, a first pressure ratio $P_0$ may be determined based on the pressure measured at the first section of bypass 70 (downstream of the turbocharger compressors and upstream of the double-ended supercharger 224). Pressure ratio $P_0$ may be estimated based on a common inlet pressure of the first and second supercharger compressors 218, 222, estimated via pressure sensor 214, relative to barometric pressure, estimated via a BP sensor, such as BP sensor 58 of FIG. 1. As another example, a second pressure ratio $P_1$ may be determined based on the pressure measured at pressure sensor 215 in the second section of bypass 70 (downstream of the double-ended supercharger 224). Pressure ratio $P_1$ may be estimated based on the pressure of the second section of bypass 70, where compressed air from the first and second supercharger compressors 218, 222 combine, estimated at pressure sensor 215, relative to the common inlet pressure of the first and second supercharger compressors 218, 222, estimated via pressure sensor 214. As another example, a third pressure ratio $P_2$ may be determined based on the pressure measured at throttle 20. Pressure ratio $P_3$ may be estimated based on the throttle inlet pressure, estimated via TIP sensor 59, relative to the combined outlet pressure of the first and second supercharger compressors 218, 222 of DES 224.

During conditions when there is a boost shortfall, such as high load conditions, the ESBV may be closed or adjusted to be less open to divert intake air to the engine cylinders via bypass 70 and flow through the DES compressors 218, 222. At the same time, the supercharger compressors may be activated, by providing electrical power to the electric motor. The rotation of the supercharger compressors via the electric motor compresses the intake air flowing therethrough and raises the pressure ratio to compensate for the boost pressure ratio shortfall. At the same time, turbocharger wastegates are closed to spool up the turbines. Once the turbines are sufficiently spooled up, and the pressure ratio across the turbochargers is raised, the ESBV may be opened.

During selected low load conditions, the ESBV may be opened or adjusted to be more open to direct air flow through the intake passage in addition to the bypass. The supercharger compressors may be deactivated by disabling electrical power to the electric motor. By providing two passages for air flow, e.g., through the intake passage and through the bypass with freewheeling supercharger compressors, the pressure ratio of the turbocharger compressors may be lowered.

The assistance from the DES may reduce turbocharger compressor operation in the surge and choke regions. By maintaining stable turbocharger compressor operation through a wider range of mass flow conditions, frequent adjusting of the VGT vanes to compensate for inefficiency of the turbocharger compressors may be reduced, thus maintaining HP-EGR flow and a fuel economy of the vehicle. By reducing frequent cycling of VGT vanes between different states, VGT wear is also reduced. Furthermore, by coupling twin turbochargers with individual intake passages to a single supercharger instead of two superchargers, packaging space and cost is reduced. This allows the boost benefit to be provided even within the limited packaging space of the boosted engine. Synchronization of the two supercharger compressors is automatically achieved due to the coupling of the compressors to the same electric motor. Also, the single bypass and bypass valve may accommodate the routing of air from both turbocharger compressors, allowing for a minimal amount of equipment and controls to operate the DES.

In addition to engine performance and fuel economy benefits, the incorporation of the double-ended supercharger into the vehicle engine system may enhance cost efficiency and mechanical longevity, as further elaborated in FIG. 3. An example embodiment of a double-ended electrical supercharger 300 is depicted in FIG. 3, without compressor outer housings, and may be an example of the double-ended supercharger (DES) 13 of FIG. 1 and 224 of FIG. 2. DES 300 is configured with a central electric motor 302 with a first shaft 304 and a second shaft 306 positioned on opposing side of the electric motor 302. The double-ended supercharger 300 has a central axis of rotation 301 about which the double-ended supercharger 300, including both a first compressor 312 rotationally coupled to the first shaft 304 and a second compressor 314 rotationally coupled to the second shaft 306, may spin. Radial journal bearings 308, herein referred to as bearings 308, are arranged on each of the first and second shafts 304, 306. The bearings 308, when lubricated with oil, allow for frictionless rotation of the first and second shafts 304, 306. Degradation of the bearings 308 may occur in supercharger configurations with a single compressor wheel. In such arrangements, an additional axial thrust bearing is included on a shaft connecting the compressor wheel to an electric motor to prevent displacement of the compressor wheel in an axial direction resulting from gas forces.

In the configuration of the double-ended supercharger 300, the axial thrust forces may be balanced by a symmetric arrangement of compressors on either side of the electric motor 302, connected to the electric motor by the first and second shafts 304, 306. Specifically, the double-ended supercharger 300 is mirror-symmetric about a plane 310 perpendicular to the central axis of rotation 301. Air flow through the first compressor 312 and the second compressor 314, as indicated by arrows 316, may exert forces equal in magnitude upon the double-ended supercharger and in opposing directions along the central axis of rotation 301, minimizing the shaft thrust load. A longevity of the radial bearings 308 is increased due to reduced friction, improving a mechanical efficiency of the DES 300 relative to a single compressor supercharger.

Additionally, by incorporating the DES 300 into an engine system with twin turbochargers instead of coupling each turbocharger to an individual supercharger, the first and second compressors 312, 314 are automatically synchronized. The packaging space occupied by the double-ended supercharger is reduced compared to the space occupied by two supercharger units. Furthermore, by operating the first and second compressors 312, 314 with a common electric motor 302, one bypass valve and bypass passage as well as a single set of electronics and control equipment may be used.

In this way, the components of FIGS. 1-3 enable a vehicle system to adjust pressure ratios and boost pressure delivered to an engine intake manifold by coupling twin turbochargers to a double-ended electrical supercharger. An engine system of the vehicle comprises air intake passages flowing air to the twin turbochargers which merge into including a common upstream intake passage. The common upstream intake passage includes a bypass with two channels that direct flow to each compressor of the double-ended supercharger. The outlet channels of the bypass rejoin into a common downstream intake passage, delivering boosted air to the engine intake adapted with two cylinder banks. Each cylinder bank is coupled an exhaust manifold that flows exhaust gas to exhaust turbines of the twin turbochargers to drive the turbocharger compressors.

The vehicle system also includes a controller which may be configured with computer readable instructions stored on non-transitory memory for adjusting a position of a bypass valve in response to boost demand, inferred pressure ratios, and turbocharger compressor operating conditions. For example, when compressor operation approaches conditions leading to surge, e.g., approaching a surge limit on a compressor operating map, the bypass valve may be closed, or adjusted to be less open, and the electric motor of the double-ended activated. At least a portion of the air flow is diverted to the bypass. Operation of the supercharger lowers the boost pressure downstream of the turbocharger compressor and upstream of the supercharger compressor, lowering a pressure ratio across the turbocharger compressor. The bypass valve and supercharger may be similarly actuated during compressor operation nearing choke but with the electric motor of the turbocharger deactivated.

Actuation of the bypass valve in combination with the double-ended supercharger may also improve engine transient response. As described above, when pressure ratios are determined to fall of short of boost demand, the bypass valve may be closed or adjusted to be less open to route at least a portion of the air downstream of the turbocharger compressors to the activated double-ended supercharger to increase boost pressure at the intake manifold. Adjusting the bypass valve to be more open with the double-ended supercharger deactivated when pressure ratios are higher than desired may assist in reducing boost pressure.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Figure 4:
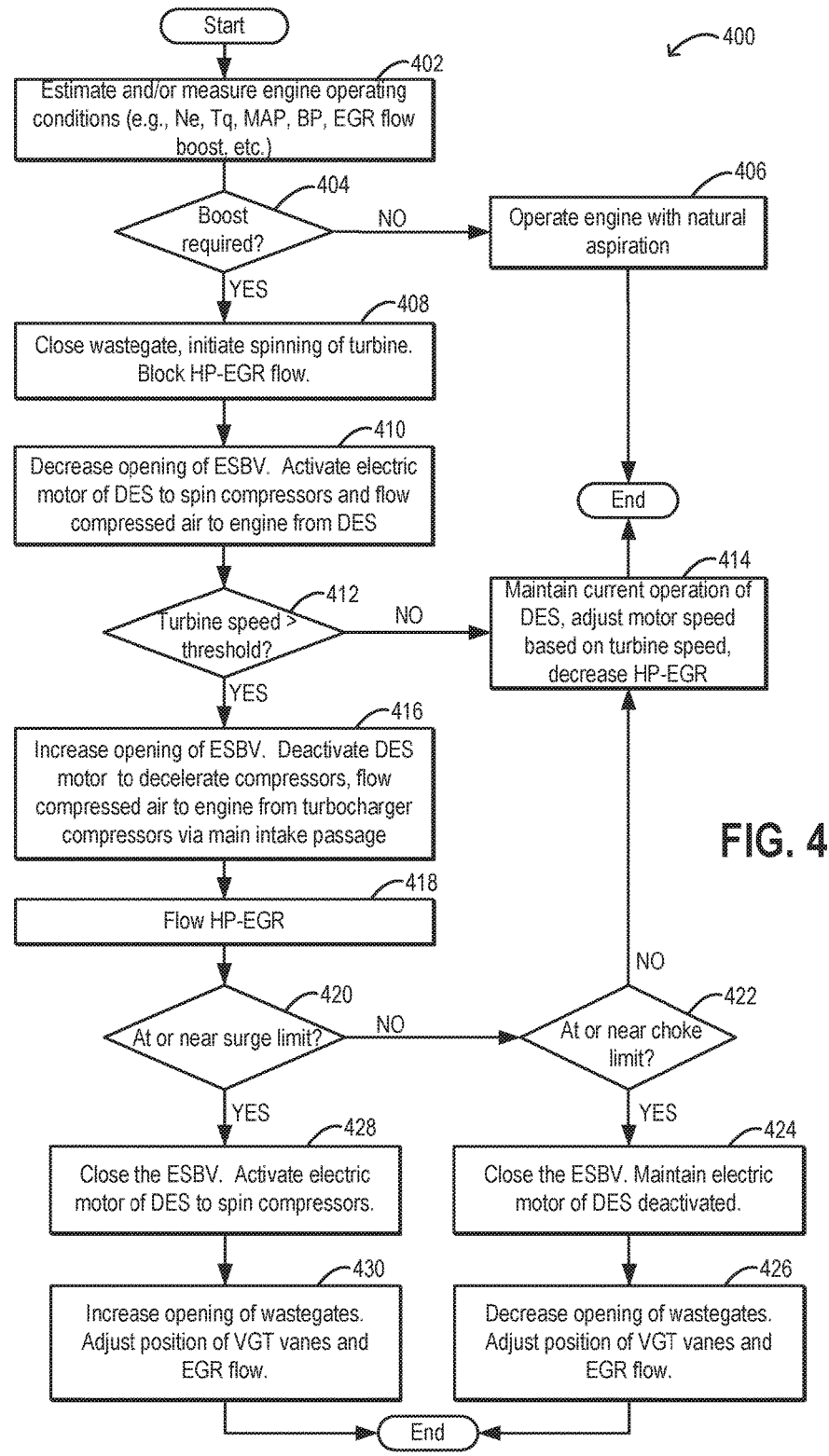
FIG. 4 shows a flow chart for operating the compound boosted engine in response to engine transients and compressor operation approaching surge and choke.
Figure 5:
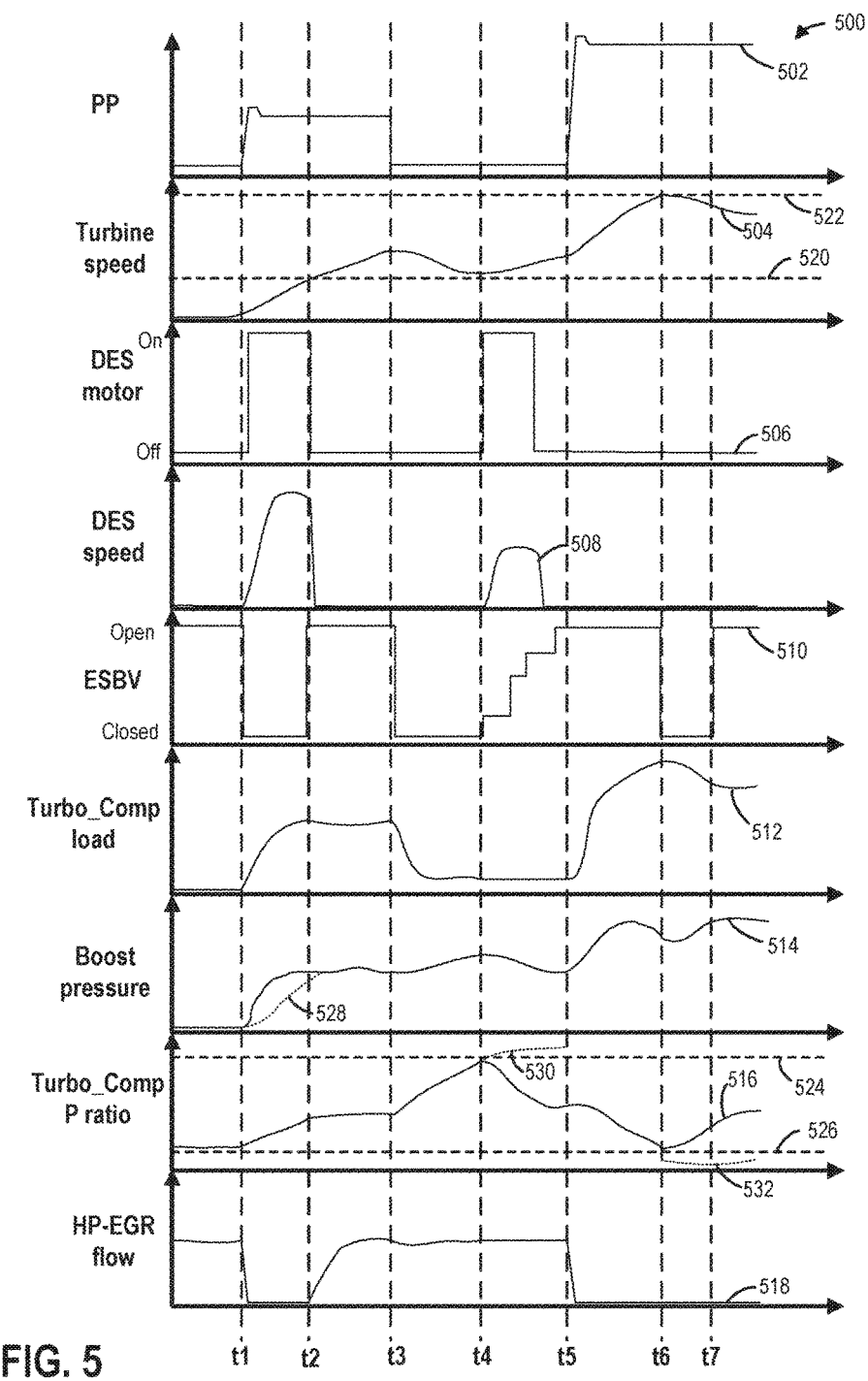
FIG. 5 shows an example engine operation map that depicts function of a double-ended supercharger in conjunction with a bypass valve.

An example method 400 is shown in FIG. 4 for operating a compound boosted engine system to improve engine transient response and avoid turbocharger compressor surge and choke. The engine system may be configured with twin variable geometry turbochargers (VGTs) arranged in parallel with air passages from the turbocharger compressors merging into a common air passage. A bypass passage may branch from the common air passage, providing an alternate path for air flow to a double-ended supercharger (DES) when a bypass valve is positioned to direct at least of portion of intake air to the bypass. The parallel turbochargers may be slower acting, primary compression devices relative to the electrically actuated DES that may have an auxiliary role in providing engine boost. The engine system may also include a high-pressure EGR (HP-EGR) path that recirculates a portion of exhaust gas from an exhaust manifold to an intake manifold of the engine. A default operation mode of the vehicle may comprise operation during low engine loads and speeds, e.g. low boost demand, with HP-EGR flow occurring and vanes of the VGTs in closed positions. Instructions for carrying out method 400 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system, such as an electric supercharger bypass valve (e.g., ESBV 72 of FIGS. 1-2), and turbocharger wastegate actuators (e.g., wastegate actuator 92 of FIG. 1) to adjust engine operation, according to the methods described below.

At 402, method 400 includes estimating and/or measuring engine operating conditions such as engine speed, operator torque demand, manifold absolute pressure, manifold air flow, boost pressure, compressor pressure ratios, HP-EGR flow, pressure ratios across certain regions of the engine, such as pressure ratios $P_0$, $P_1$, $P_2$ of FIG. 2. For example, boost pressure may be estimated at a throttle-inlet pressure sensor, such as by TIP sensor 59 of FIGS. 1-2. EGR flow through a passage coupling an exhaust manifold of the engine to an intake passage downstream of the turbocharger compressors, as shown at FIG. 2, may be determined by a differential pressure sensor EGR (DPFE). At 404, the method includes determining if boost is required. In one example, boost may be required at mid-high engine loads. In another example, boost may be required in response to an operator pedal tip-in or increase in driver torque demand. It may be estimated that a pressure ratio, inferred by a pressure differential between pressure sensors such as the pressure sensor 58 and the TIP sensor 59 of FIG. 1, does not meet the boost demand as indicated by the pedal tip-in and increased boost from the VGTs is desired.

If boost is not required, the method continues to 406 wherein the engine is operated with natural aspiration. If boost is required, then at 408, the method includes closing an exhaust wastegate to channel exhaust gas exclusively to exhaust turbines of the turbochargers, allowing an acceleration of the turbines' rotational speed. A negative pressure differential between the exhaust manifold and the intake manifold may not be sufficient to open an EGR valve to circulate exhaust gas to the intake and thus EGR flow is blocked. An opening of the electric supercharger bypass valve (ESBV) is decreased at 410 while activating an electric motor of the double-ended supercharger (DES). The amount that the opening of the ESBV is decreased by may be based on the amount of boost requested while the VGT turbines are spinning below a minimum speed to provide enough boost to meet the driver torque demand. For example, higher boost demands may result in actuating the ESBV to less open positions. In cases where boost demand is very high, the ESBV may be fully closed. By decreasing the opening of or closing the ESBV, air is directed through the bypass passage to the DES compressors. The electric motor drives rotation of the DES compressors at a speed based on the boost demand and air diverted to the bypass passage by the ESBV is compressed by the DES before flowing to the engine intake. The controller may refer to a look-up table, algorithm, or model which uses the desired boost pressure as an input that provides a corresponding electric motor power as an output. The DES may have a faster response time than the VGTs and therefore may be able to deliver boost much faster. As such, the DES may significantly decrease turbo lag.

Exhaust turbines of the VGTs, upstream of the DES, concurrently spin up as exhaust heat and pressure develops due to cylinder combustion. The rotational speed that the turbines are accelerated to may be based on the boost demand. For example, the higher the demand for boost, the faster the turbines are spun. The spinning of the turbines is mechanically transmitted to the VGT compressors, driving rotation of the compressors. At 412, it may be determined if the turbine speed is higher than a threshold, such as above a threshold where the turbocharger is able to sustain the boost demand. The threshold is a non-zero positive threshold. If not, operation of the DES is maintained at 414 while adjusting the speed of the electrical motor of the DES based on the speed of the turbine. For example as the turbine speed increases, less boost assist is desired and the motor speed is decreased. HP-EGR flow may be decreased or stopped to allow more of the exhaust gas generated at the cylinders to be directed towards driving rotation of the turbines. The reduction in HP-EGR flow may be based on the difference between the amount of boost provided by the turbocharger compressor via the exhaust turbine and the amount of boost demanded. For example, the greater difference, the further the HP-EGR flow is reduced and less exhaust gas is recirculated.

If turbine speed is higher than the threshold, then the method proceeds to 416 to increase the opening of the ESBV. The amount of opening of the ESBV may be based on the amount that turbine speed surpasses the threshold. For example, the more the speed is above the threshold, the greater the opening of the ESBV. By increasing the opening of the ESBV, less or no air is diverted to the bypass passage and the electric motor of the DES is deactivated. Air is boosted exclusively by the twin VGTs before combustion at the cylinders, flowing through main intake passages of the engine system. Thus, after the turbine has spun up sufficiently, the method includes channeling air flow from the twin VGTs directly to the engine intake without boost assist from the DES. By transiently operating the DES until the VGT turbines are spun up, turbo lag due to delays in spooling the VGT compressors is reduced and vehicle energy consumption is conserved.

As turbocharger compressors are operating at high enough speeds to meet the boost demand, the pressure differential between the exhaust manifold and intake manifold be sufficient to resume HP-EGR flow at 418. The pressure differential is also sustained by the nozzle vanes of the VGTs remaining in a closed position. In one example, the vanes may be adjusted slightly more open to accommodate the higher spinning speeds of the VGT turbines without degrading the pressure differential.

At 420, once the VGT compressors are spinning up and providing boosted air to the engine, it may be determined if the VGT compressors are operating at or near a surge limit. Compressor surge may occur from a tip-out event resulting in a sudden drop in torque demand and decreasing air flow through the compressor. As the air flow through the compressor drops, the compressor operating point moves closer to a surge limit (that is, there is a drop in the margin to the surge limit). If the compressors are not at or near the surge limit then the method continues to 422 to determine if the compressors are operating at or near a choke limit.

Compressor choke may occur from a tip-in event subsequent to engine operation at low load, resulting in an abrupt increase in torque demand and increasing air flow through the compressor. As the air flow through the compressor rises, the compressor operating point moves close to a choke limit, which may be a maximum rated tolerance of the turbocharger with respect to turbine rotation. As compressor operation approaches the choke limit, the margin to the choke limit rapidly decreases.

If the compressors are not at or approaching the choke limit, the method returns to 414 to maintain a current operating condition of the turbochargers with the DES off and ESBV open (e.g., the conditions of 416). HP-EGR flow may be reduced to accommodate the higher spinning speed of the VGT turbines. If the compressor are at or near the choke limit, at 424, the ESBV is closed. The electric motor of the DES is maintained off so that no boost assistance is supplied. Compressed air from the VGT compressors are routed through the bypass passage with the freewheeling DES compressors in the pathway of air flow. Flow resistance at outlets of the turbocharger compressors is generated, thereby increasing a pressure ratio across the compressors and alleviating compressor choke. At 426, the controller may also command wastegate actuators to decrease openings of the wastegates to increase the amount of exhaust gas delivered to the exhaust turbines. The alleviation of VGT compressor choke by actuation of the ESBV may avoid adjustment of the turbine nozzle vanes to compensate for high mass flow through the VGT compressors. Thus, a position, e.g., width of openings, of the VGT vanes may be maintained as well as a flow of HP-EGR that is based on the vanes being in a closed or slightly open position.

Returning to 420, if the VGT compressors are determined to be operating at or approaching the surge limit, the method includes closing the ESBV at 428 to block air flow through the main intake passage and divert flow to the bypass passage with the DES. The electric motor of the DES may be activated to spin the DES compressors. The rotational speed at which the DES compressors are spin may be based on a pressure ratio across the turbocharger compressors. As the turbocharger compressors margin to the surge limit drops, the pressure ratio across the compressors increase and, in response, greater motor torque is supplied to the DES compressors to spin the compressors faster. Compression of air by the DES downstream of the VGTs reduces the pressure in intake passages between the VGT compressor outlets and the DES compressor inlets, thus lowering the pressure ratio across the VGT compressors and providing sufficient surge margin. At 430, the method includes increasing the wastegate openings to vent the boost pressure accumulated during operation of the DES. The wastegate is often fully opened during compressor surge to reduce turbine speed. However, operation of the DES alleviates turbocharger compressor surge faster than can be achieved by opening the wastegates. Thus, the wastegate may be opened less when surge mitigation is performed by the DES and subsequent boost demands may be met more rapidly. Additionally, the position of the VGT vanes may be adjusted to be less open than VGT compressor operation during rapid tip-outs without electrical boost assist, thus maintaining EGR flow.

In this way, a method for a compound boosted engines includes decreasing an opening of an electric supercharger bypass valve to divert more air flow to a bypass passage comprising compressor of a double-ended electrical supercharger and activating the electric motor of the supercharger when twin turbochargers are not sufficiently spooled to meet a boost demand. The double-ended electrical supercharger initially provides boost to the engine intake until exhaust turbines of the turbochargers are spun up and able to deliver the desired boost pressure. The supercharger may then be deactivated until boost assistance is required. The method further comprises diverting air flow from the main intake passage, downstream of the twin turbochargers to the bypass passage by closing the bypass valve during operating conditions leading to turbocharger compressor surge or choke. By activating the supercharger during conditions nearing compressor surge, a pressure gradient across the turbocharger compressor may be reduced. By maintaining the electrical motor of the supercharger off while the bypass valve is closed during compressor operation approaching choke, air flow downstream of the turbocharger compressor is hindered, thus decreasing mass air flow into the turbocharger compressor and avoiding compressor stonewall.

An example map 500 is shown in FIG. 5 for improving engine transient response and mitigating compressor surge and choke by providing electrical boost assist via a double-ended electrical supercharger (DES). Map 500 depicts an accelerator pedal position at plot 502, a speed of exhaust turbines of a set of twin turbochargers at plot 504, and actuation of an electric motor driving rotation of compressors of a double-ended electrical supercharger (DES) between off and on configurations at plot 506. A speed of the compressors of the DES is shown at plot 508. Positioning of an electrical supercharger bypass valve (ESBV) is shown at plot 510 and turbocharger compressor load is shown at plot 512. A boost pressure of the engine is depicted at plot 514, a pressure ratio across the twin turbochargers is shown at plot 516, and exhaust gas flow through a HP-EGR system is shown at plot 518. All plots are shown over time, along the x-axis. Thresholds are indicated by dashed horizontal lines. For example, plot 504 includes a minimum threshold turbine speed 520 sufficient to meet an associated boost demand and a maximum threshold turbine speed 522 that represents a maximum tolerance of the turbocharger. Plot 516 includes a surge limit 524 and a choke limit 526 of the turbocharger compressors.

Prior to t1, the engine may be operating un-boosted due to a lower operator torque demand, as shown as plot 502, and vehicle speed. Exhaust gas is circulated through the HP-EGR system, the DES motor is off (plot 508) and the ESBV is open (plot 510). At t1, in response to a tip-in (plot 502), boost may be demanded. An exhaust wastegate is closed, directed exhaust gas to the exhaust turbine, which begins to spin at speeds well below the minimum threshold 520 for supplying boost to meet the boost demand. The electrical motor of the DES is commanded to turn on (plot 506), driving rotation of the DES compressors and quickly increasing the speed of the DES. The ESBV is closed to direct intake air flow to the bypass passage to be compressed by the DES and HP-EGR flow is disabled. The electric motor output to the DES and resulting speed of the DES compressors is adjusted based on the demand for boost. For example, the higher the boost demand, the faster the DES compressors are spun.

Between t1 and t2, the turbine speed increases while the DES reaches a speed sufficient to deliver boosted air to meet the boost demand quickly. Compression of intake air by the DES raises the boost pressure delivered to the engine intake. The rate of boost pressure rise without boost assist from the DES is shown for comparison by dashed line 528 at plot 514. Turbocharger compressor loads increase as well as pressure ratios across the turbocharger compressors.

At t2, the turbine speed reaches the minimum threshold 520 for meeting the boost demand, prompting the deactivation of the DES motor. The detection of the turbine speed passing the minimum threshold 520 results in deactivation of the DES motor so that the DES compressors stop spinning and the ESBV is opened, allowing air to flow directly from the turbocharger compressors to the engine intake. The source of boost is shifted from the DES to the turbocharger compressors once the turbines are sufficiently spooled. Pressure in the exhaust gas manifold rises, generating a pressure differential between the exhaust manifold and intake manifold to drive HP-EGR flow. Engine operations are maintained between t2 and t3 until, at t3, a tip-out is detected.

The tip-out results in the closing of a throttle valve, such as throttle valve 20 of FIGS. 1-2, leading to an increase in pressure ratio across the turbocharger compressors while compressor loads decrease. Closing of the throttle valve also decreases exhaust gas formation as a combustion product, slowing the speed of the turbines. The pressure ratio across the turbocharger compressors continues to rise as pressure accumulates at outlet ends of the turbocharger compressors until, at t4, the margin to surge decreases to an extent that the compressors are operating near or at the surge limit.

Detection of high pressure ratios across the turbocharger compressors associated with surge triggers the activation of the DES motor, quickly spinning up the DES compressors. The ESBV opening is decreased at t4, directing a portion of the intake air to the DES while still allowing the remainder of the air to flow through the turbochargers to avoid boosting the engine above the demanded amount of torque. By activating the DES, air is drawn into the bypass passage through the DES, relieving the pressure buildup between the outlet ends of the turbocharger compressors and inlet ends of the DES compressors. Between t4 and t5, the pressure ratios across the turbocharger compressors decrease, increasing the surge margin. For comparison, the pressure ratios of the turbocharger compressors without activation of the DES is shown by dashed line 530 at plot 516. As the pressure ratios decrease, the ESBV opening gradually increases, until the ESBV is fully open when the pressure ratio of the turbocharger compressors are well within the range for stable operation. The DES motor is turned off between t4 and t5 when the pressure decreases below a threshold of the surge limit by an amount, for example, 10% of the maximum allowable pressure ratio.

At t5, a tip-in may be detected, fully opening the throttle valve and driving an increase in turbine speed, and thus turbocharger compressor speed. Turbocharger compressor loads and boost pressure rise while pressure ratios drop. Subsequent to the tip-in, HP-EGR flow is blocked.

The turbine speed approaches the maximum threshold turbine speed 514 of the turbocharger at t6. Concurrently, compressor operation reaches the choke limit, initiating the closing of the ESBV. Air flow is diverted from outlet ends of the turbocharger compressors to the bypass passage, experiencing resistance as the air flows through the deactivated supercharger compressors. Mass flow through the turbocharger compressors is decreased, allowing the margin to choke to increase between t6 and t7 and the pressure ratio to rise as turbine speed decreases below the maximum threshold speed 514. For comparison, the pressure ratio of the turbocharger compressor without assistance from the DES is shown by dashed line 532 at plot 516. At t7, the turbocharger compressor pressure ratios have increased above a threshold of the choke limit by an amount, such as 10% of maximum allowable pressure ratio. The ESBV is opened to resume air flow through the main intake passage from the turbocharger compressors to the engine intake, bypassing the supercharger.

In this way, a method for a compound boosted engines includes decreasing an opening of an electric supercharger bypass valve to divert more air flow to a bypass passage comprising compressor of a double-ended electrical supercharger and activating the electric motor of the supercharger when twin turbochargers are not sufficiently spooled to meet a boost demand. The double-ended electrical supercharger initially provides boost to the engine intake until exhaust turbines of the turbochargers are spun up and able to deliver the desired boost pressure. The supercharger may then be deactivated until boost assistance is required. The method further comprises diverting air flow from the main intake passage, downstream of the twin turbochargers to the bypass passage by closing the bypass valve during operating conditions leading to turbocharger compressor surge or choke. By activating the supercharger during conditions nearing compressor surge, a pressure gradient across the turbocharger compressor may be reduced. By maintaining the electrical motor of the supercharger off while the bypass valve is closed during compressor operation approaching choke, air flow downstream of the turbocharger compressor is hindered, decreasing mass air flow into the turbochargers and avoiding compressor choke. The technical effect of providing boost assist with a double-ended electrical supercharger that may be opportunistically activated is that turbocharger compressors may operate under a wider flow range, thereby improving peak performance and fuel economy of a vehicle.

As one embodiment, a supercharger includes an electric motor including a first output shaft and a second output shaft positioned on opposing sides of the electric motor and sharing a common rotational axis, a first compressor rotationally coupled to the first shaft, and a second compressor rotationally coupled to the second shaft. A first example of the supercharger includes the first compressor and the second compressor coupled parallel relative to one another and symmetrically coupled to opposite ends of the electric motor and driven by a common output shaft comprising the first output shaft and the second output shaft. A second example of the supercharger optionally includes the first example, and further includes a first journal bearing coupled to the first output shaft and a second journal bearing coupled to the second output shaft. A third example of the supercharger optionally includes one or more of the first and second examples, and further includes, wherein the first compressor and the second compressor are symmetric to one another, and wherein the first journal bearing and the second journal bearing are symmetric to one another. A fourth example of the supercharger optionally includes one or more of the first through third examples, and further includes, wherein rotation of the electric motor rotates both the first compressor and the second compressor at a common speed. A fifth example of the supercharger optionally includes one or more of the first through fourth examples, and further includes, wherein the supercharger is positioned within an air conduit and wherein a first portion of air received in the air conduit is directed through the first compressor and a second, remaining portion of the air received in the air conduit is directed through the second compressor, the first portion substantially equal to the second portion. A sixth example of the supercharger optionally includes one or more of the first through fifth examples, and further includes, wherein the supercharger is coupled in a vehicle, the supercharger further comprising a controller with computer-readable instructions for adjusting an output of the electric motor based on vehicle operator torque demand.

In another embodiment, an engine system includes an engine, a first compressor driven by an exhaust turbine, an intake passage including the first compressor and a bypass valve, a second compressor including two symmetric impellers coupled via an output shaft to opposing ends of an electric motor, and a bypass passage including the second compressor, an inlet of the bypass passage coupled to the intake passage upstream of the bypass valve and downstream of the first compressor, and outlet of the bypass passage coupled to the intake passage downstream of the bypass valve. In a first example of the system the inlet of the bypass passage is positioned upstream of a confluence of a first inlet of a first of the two impellers of the second compressor and a second inlet of a second of the two impellers of the second compressor, and wherein the outlet of the bypass passage is positioned downstream of another confluence of a first outlet of the first of the two impellers and a second outlet of the second of the two impellers. A second example of the system optionally includes the first example, and further includes a controller with computer-readable instructions stored on non-transitory memory for adjusting a position of the bypass valve based on operator torque demand and turbine speed. A third example of the system optionally includes one or more of the first and second examples, and further includes, wherein the adjusting includes; responsive to an increase in the operator torque demand, opening the bypass valve to provide compressed air to the engine via the first compressor when the turbine speed is higher than a threshold speed, and closing the bypass valve to provide compressed air to the engine via each of the two impellers of the second compressor when the turbine speed is lower than the threshold speed. A fourth example of the system optionally includes one or more of the first through third examples, and further includes, wherein the controller includes further instructions for, after closing the bypass valve, adjusting an output of the electric motor based on the increase in operator torque demand, wherein the output of the electric motor simultaneously rotates each of the two impellers at a common speed. A fifth example of the system optionally includes one or more of the first through fourth examples, and further includes, wherein the controller includes further instructions for selectively closing the bypass valve and increasing an output of the electric motor while flowing compressed air to the engine via the first compressor responsive to a pressure ratio across the first compressor being within a threshold of a surge limit or a choke limit of the first compressor. A sixth example of the system optionally includes one or more of the first through fifth examples, and further includes, wherein the exhaust turbine is a variable geometry turbine positioned in an exhaust passage of the engine, wherein the system further comprises a high pressure exhaust gas recirculation (HP-EGR) passage for recirculating exhaust gas from the exhaust passage, upstream of the turbine, to the intake passage, downstream of the outlet of the bypass passage, and wherein the controller includes further instructions for adjusting a nozzle flow area of the variable geometry turbine to vary EGR flow through the HP-EGR passage. A seventh example of the system optionally includes one or more of the first through sixth examples, and further includes, wherein the controller includes further instructions for; responsive to the pressure ratio across the first compressor being within the threshold of the surge limit, decreasing the nozzle flow area by a first amount, and responsive to the pressure ratio across the first compressor being within the threshold of the choke limit, increasing the nozzle flow area by a second, each of the first and the second amount based on the increased output of the electric motor. An eighth example of the system optionally includes one or more of the first through seventh examples, and further includes, wherein the first compressor and the exhaust turbine are included in a twin turbocharger system.

As another embodiment, a method includes responsive to an increase in operator torque demand, closing a waste-gate to spool up a turbocharger, closing a bypass valve coupled in an air intake passage to divert air into a bypass, and operating an electric motor of a double-ended electric supercharger positioned in the bypass to direct compressed air to an engine via each of a pair of compressors of the supercharger. In a first example of the method, after spooling up the turbocharger, the bypass valve is opened and the electric motor is disabled to direct compressed air to the engine via a compressor of the turbocharger, and air is flowed via the compressor of the turbocharger, while selectively closing the bypass valve and operating the electric motor responsive to a pressure ratio across the turbocharger compressor being within a threshold of a choke margin or a surge margin. A second example of the method optionally includes the first example and further includes wherein the turbocharger compressor is driven by a variable geometry turbine, the method further comprising, increasing a nozzle flow area of the turbine responsive to the pressure ratio across the turbocharger compressor being within the threshold of the choke margin and decreasing the nozzle flow area of the turbine responsive to the pressure ratio across the turbocharger compressor being within the threshold of the surge margin, a degree of the increasing and decreasing of the nozzle flow area based on an output of the electric motor. A third example of the method optionally includes one or more of the first and second examples, and further includes, decreasing opening of an EGR valve to increase recirculation of exhaust gas from upstream of the turbine to downstream of the supercharger responsive to the pressure ratio across the turbocharger compressor being within the threshold of the surge margin and increasing the opening of the EGR valve to decrease the recirculation of exhaust gas from upstream of the turbine to downstream of the supercharger responsive to the pressure ratio across the turbocharger compressor being within the threshold of the choke margin, a degree of the increasing and decreasing of the opening of the EGR valve based on the output of the electric motor.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a supercharger, comprising:
an electric motor of the supercharger including a first output shaft and a second output shaft positioned on opposing sides of the electric motor and sharing a common rotational axis;
a first compressor of the supercharger rotationally coupled to the first output shaft;
a second compressor of the supercharger rotationally coupled to the second output shaft; and
a bypass passage including a valve, the bypass passage configured to divert air flow in an air conduit to both the first compressor and the second compressor.

2. The system of claim 1, wherein the first compressor and the second compressor are coupled parallel relative to one another and symmetrically coupled to opposite ends of the electric motor and driven by a common output shaft comprising the first output shaft and the second output shaft.

3. The system of claim 1, further comprising a first journal bearing coupled to the first output shaft and a second journal bearing coupled to the second output shaft.

4. The system of claim 3, wherein the first compressor and the second compressor are symmetric to one another, and wherein the first journal bearing and the second journal bearing are symmetric to one another.

5. The system of claim 1, wherein rotation of the electric motor rotates both the first compressor and the second compressor at a common speed.

6. The system of claim 1, wherein the supercharger is positioned within the air conduit and wherein a first portion of air received in the air conduit is directed through the first compressor and a second, remaining portion of the air received in the air conduit is directed through the second compressor, the first portion substantially equal to the second portion.

7. The system of claim 1, wherein the supercharger is coupled in a vehicle, the supercharger further comprising a controller with computer-readable instructions for adjusting an output of the electric motor based on vehicle operator torque demand.

8. An engine system, comprising:
an engine;
a first compressor driven by an exhaust turbine;
an intake passage including the first compressor and a bypass valve;
a second compressor including two symmetric impellers coupled via an output shaft to opposing ends of an electric motor; and
a bypass passage including the second compressor, an inlet of the bypass passage coupled to the intake passage upstream of the bypass valve and downstream of the first compressor, and an outlet of the bypass passage coupled to the intake passage downstream of the bypass valve.

9. The system of claim 8, wherein the inlet of the bypass passage is positioned upstream of a confluence of a first inlet of a first of the two impellers of the second compressor and a second inlet of a second of the two impellers of the second compressor, and wherein the outlet of the bypass passage is positioned downstream of another confluence of a first outlet of the first of the two impellers and a second outlet of the second of the two impellers.

10. The system of claim 8, further comprising a controller with computer-readable instructions stored on non-transitory memory for adjusting a position of the bypass valve based on operator torque demand and turbine speed.

11. The system of claim 10, wherein the adjusting includes:
responsive to an increase in the operator torque demand, opening the bypass valve to provide compressed air to the engine via the first compressor when the turbine speed is higher than a threshold speed; and
closing the bypass valve to provide compressed air to the engine via each of the two impellers of the second compressor when the turbine speed is lower than the threshold speed.

12. The system of claim 11, wherein the controller includes further instructions for, after closing the bypass valve, adjusting an output of the electric motor based on the increase in operator torque demand, wherein the output of the electric motor simultaneously rotates each of the two impellers of the second compressor at a common speed.

13. The system of claim 12, wherein the controller includes further instructions for selectively closing the bypass valve and increasing the output of the electric motor while flowing compressed air to the engine via the first compressor responsive to a pressure ratio across the first compressor being within a threshold of a surge limit or a choke limit of the first compressor.

14. The system of claim 13, wherein the exhaust turbine is a variable geometry turbine positioned in an exhaust passage of the engine, wherein the system further comprises a high pressure exhaust gas recirculation (HP-EGR) passage for recirculating exhaust gas from the exhaust passage, upstream of the turbine, to the intake passage, downstream of the outlet of the bypass passage, and wherein the controller includes further instructions for adjusting a nozzle flow area of the variable geometry turbine to vary EGR flow through the HP-EGR passage.

15. The system of claim 14, wherein the controller includes further instructions for:
responsive to the pressure ratio across the first compressor being within the threshold of the surge limit, decreasing the nozzle flow area by a first amount; and
responsive to the pressure ratio across the first compressor being within the threshold of the choke limit, increasing the nozzle flow area by a second amount, each of the first amount and the second amount based on the increased output of the electric motor.

16. The system of claim 8, wherein the first compressor and the exhaust turbine are included in a twin turbocharger system.

17. A method for a boosted engine system, comprising:
responsive to an increase in operator torque demand,
closing a waste-gate to spool up a turbocharger;
closing a bypass valve coupled in an air intake passage to divert air into a bypass; and
operating an electric motor of a double-ended electric supercharger positioned in the bypass to direct compressed air to an engine via each of a pair of compressors of the supercharger.

18. The method of claim 17, further comprising:
after spooling up the turbocharger, opening the bypass valve and disabling the electric motor to direct compressed air to the engine via a compressor of the turbocharger; and
while flowing air via the turbocharger compressor, selectively closing the bypass valve and operating the electric motor responsive to a pressure ratio across the turbocharger compressor being within a threshold of a choke margin or a surge margin.

19. The method of claim 18, wherein the turbocharger compressor is driven by a variable geometry turbine, the method further comprising increasing a nozzle flow area of the turbine responsive to the pressure ratio across the turbocharger compressor being within the threshold of the choke margin and decreasing the nozzle flow area of the turbine responsive to the pressure ratio across the turbocharger compressor being within the threshold of the surge margin, a degree of the increasing and decreasing of the nozzle flow area based on an output of the electric motor.

20. The method of claim 19, further comprising decreasing opening of an EGR valve to increase recirculation of exhaust gas from upstream of the turbine to downstream of the supercharger responsive to the pressure ratio across the turbocharger compressor being within the threshold of the surge margin and increasing the opening of the EGR valve to decrease the recirculation of exhaust gas from upstream of the turbine to downstream of the supercharger responsive to the pressure ratio across the turbocharger compressor being within the threshold of the choke margin, a degree of the increasing and decreasing of the opening of the EGR valve based on the output of the electric motor.

* * * * *